(12) United States Patent
Sun

(10) Patent No.: US 6,242,858 B1
(45) Date of Patent: *Jun. 5, 2001

(54) ELECTROLUMINESCENT PHOSPHOR THIN FILMS

(75) Inventor: Sey-Shing Sun, Beaverton, OR (US)

(73) Assignee: Planar Systems, Inc., Beaverton, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/153,266

(22) Filed: Sep. 14, 1998

(51) Int. Cl.[7] ................................................. H01J 1/62
(52) U.S. Cl. .......................... 313/503; 313/498; 313/502
(58) Field of Search ..................... 313/502, 503, 313/504, 505, 512, 467, 468, 483, 498, 499, 506; 252/301.4 S, 301.4 H; 427/67, 64; 257/103

(56) References Cited

U.S. PATENT DOCUMENTS

| | | | |
|---|---|---|---|
| 4,365,184 | * | 12/1982 | Higton et al. .................. 313/503 |
| 4,442,377 | * | 4/1984 | Higton et al. .................. 313/503 |
| 4,725,344 | * | 2/1988 | Yocom et al. ............... 204/192.15 |
| 4,751,427 | * | 6/1988 | Barrow et al. ................. 313/503 |
| 5,598,059 | * | 1/1997 | Sun et al. ...................... 313/509 |
| 5,677,594 | * | 10/1997 | Sun et al. ...................... 313/503 |
| 5,939,825 | * | 8/1999 | Sun et al. ...................... 313/503 |
| 6,043,602 | * | 3/2000 | Sun et al. ...................... 313/503 |
| 6,072,198 | * | 6/2000 | Sun et al. ...................... 257/103 |

* cited by examiner

Primary Examiner—Nimeshkumar D. Patel
Assistant Examiner—Matthew J. Gerike
(74) Attorney, Agent, or Firm—Chernoff, Vilhauer, McClung, & Stenzel

(57) ABSTRACT

A light emitting phosphor having improved luminance is incorporated into an ACTFEL device which includes a phosphor layer having the formula $M^{II}S:Cu,Ag$ where $M^{II}$ is taken from the group calcium, strontium, barium and magnesium, S is sulfur, Cu is copper, and Ag is silver.

10 Claims, 6 Drawing Sheets

ELECTROLUMINESCENT PHOSPHOR THIN FILMS

BACKGROUND OF THE INVENTION

The present invention relates to thin film electroluminescent phosphor material.

Thin films of rare earth doped alkaline earth sulfides such as cerium doped strontium sulfide have been extensively investigated for applications in full color alternating current thin film electroluminescent (ACTFEL) display devices. Such a device is disclosed by Barrow et al., U.S. Pat. No. 4,751,427, incorporated by reference herein. The emission spectrum of SrS:Ce is very broad covering both blue and green portions of the visible spectrum, i.e., 440 to 660 nm with a peak at around 500 nm. A full color ACTFEL display device can be obtained by adding a red emitting phosphor, for example CaS:Eu or one that has a red component in its emission spectrum. With such a combination of films, one can build a white light emitting phosphor stack. White phosphor structures can then be laminated with primary color filters to build a color display which is very cost effective in terms of production.

With white light emitting phosphor stacks, however, the blue portion of the emission spectrum can be rather weak, particularly strontium sulfide phosphor doped with cerium which in the past has been one of the most promising of the blue emitting phosphors. Only about 10% of the original luminance can be obtained after filtering if a nearly blue color is to be achieved. For blue coloration in the CIE range of x=0.10, y=0.13 the transmission ratio is further reduced to only about 4%. Therefore, to produced a color display with acceptable luminance, it is necessary to use a lighter blue color filter but this in turn leads to a compromised blue chromaticity. Any display fabricated with such a poor blue chromaticity has a limited color gamut and is unable to produce the range of colors available with CRT or LCD technology.

Therefore, in order to achieve a high performance color ACTFEL display, the blue emission efficiency of the electroluminescent phosphor thin film must be greatly improved. In U.S. Pat. No. 4,725,344, Yocom et al., a method is disclosed for forming alkaline earth sulfide luminescent films by chemical reaction between alkaline earth metal halide and hydrogen sulfide on heated substrates. Yocom et al. does show a strontium sulfide thin film phosphor which has a more bluish color (CIE x=0.17, y=0.25) than an unfiltered SrS:Ce device. However, the luminance performance of the Yocom et al. device is not high enough for practical application. Experimentation has also been reported regarding SrS:Cu devices which are prepared by sputtering, for example in Ohnishi et al., proceedings of the SID 31/1, 31 (1992). The Ohnishi et al. device, however, is even dimmer than the Yocom et al. device (and no color data is available).

Higton et al., U.S. Pat. No. 4,365,184, disclose what is generally known in the art as a powder electroluminescent device. The construction of a powder electroluminescent includes a pair of electrodes with a phosphor layer interposed therebetween. The phosphor layer is a thick film, generally having a thickness of 25 microns or more, which is normally applied in a manner similar to paste. Powder electroluminescent devices are illuminated using a direct current. The use of a direct current between the electrodes is necessary because the powder phosphor layer, as taught by Higton et al., is a semi-insulative material and a large net direct current flow is required for illumination. The core of each phosphor particle is coated, or otherwise formed, with a resistive layer injects carriers into the powder and a much lower average electric field strength than tunneling fields required for the operation of thin film alternating current electroluminescent devices, as previously described. This resistive current then excites the activator atoms in the powder phosphor to emit light. Unfortunately, the characteristics of the resistive layer changes during extended usage which raises its threshold voltage. The increase in the threshold voltage thereby decreases the brightness of the display. If the resistive layer surrounding the particles were removed then the phosphor layer would act as a short circuit rendering the device ineffective. In contrast to ACTFEL devices, the use of an AC signal on a direct current powder device, as taught by Higton et al., would not impose a sufficient voltage on the particles for illumination. Further, if an AC voltage was applied to the powder electroluminescent device disclosed by Higton et al. the efficiency of the device would be extremely low because of the resistance layer. Because of the different operating principles between powder devices and ACTFEL devices, together with different phosphor material characteristics (resistive layer and thickness), one would not consider powder phosphors suitable for thick-film powder devices disclosed by Higton et al. suitable for an ACTFEL device.

Lehmann, in a paper titled "Alkaline Earth Sulfide Phosphorous Activated by Copper, Sulfur, and Gold," reported that strontium sulfides doped with monovalent ions with a $d^{10}$ configuration, e.g., $Cu^+$ and $Ag^+$, emit green and blue light, respectively, when excited by an electron bombardment. Lehmann was attempting to develop a powder cathode phosphor material suitable for cathodo ray tube devices. Such phosphor powder materials are considered unsuitable for alternating current film electroluminescent devices, such as the device disclosed by Barrow et al.

Vecht et al., in a paper entitled "DC Electroluminescence in Alkaline Earth Sulfides" disclose a powder direct current electroluminescent device using a SrS:Cu powder where the emission is a green color. Like Higton et al., such a phosphor is not suitable for alternating current thin film electroluminescent devices.

Sun et al., U.S. Pat. No. 5,309,070, disclose a (Sr,Ca)$Ga_2S_4$:Ce phosphor for an ACTFEL device. Such a phosphor offers a saturated blue color, e.g., (CIE x=0.15, y=0.10–0.20), but the luminous efficiency is poor, e.g., e40=0.02–0.03 lm/W. In addition, it is extremely difficult to fabricate such a composition as a thin film with good crystallinity at reasonable low substrate temperatures due to its complex chemistry.

A blue emitting SrS:Cu electroluminescent phosphor for alternating current thin-film electroluminescent devices was reported by Kane et al. in a paper entitled "New Electroluminescent Phosphorous Based on Strontium Sulfide." However, the device taught by Kane et al. has a poor performance, e.g., less than 1.0 cd/m$^2$ at 60 Hertz.

Sun et al., in a paper entitled "A Bright and Efficient New Blue TFEL Phosphor," developed a phosphor, namely, SrS:Cu, with an increased luminous performance over the prior known blue phosphors.

Velthaus et al., in a paper entitled "New Deposition Process for Very Blue and Bright SrS:Ce,Cl TFEL Devices," disclose the use of silver as a co-doping 25 material for SrS:Ce,Cl thin-film electroluminescent devices. Velthaus et al. suggest that the silver co-doping improves the emission spectrum of SrS:Ce electroluminescent devices to a more bluish color. The improvement was attributed to the effect of the Ag$^+$ charge compensation for the Ce$^{3+}$ to eliminate the Sr$^{2+}$ vacancies. The mechanism can be thought of as the cerium 3+ replacing the strontium 2+ cites leaving an extra positive charge left over. The strontium vacancies, which are defects, degrade the crystallinity and cause a red shift of the emission which results in a more greenish color. Velthaus et al.'s theory is that silver which has a single positive charge added to the phosphor as a co-dopant averages out the cerium to result in a net average charge of 2+ to provide charge compensation. In this way, the emission spectrum is shifted toward blue from what it would otherwise have been without the silver. However, SrS:Ag is not recognized by those designing phosphors suitable for alternating current thin film electroluminescent devices as being an efficient phosphors since its cathodoluminescent efficiency is poor when compared to that of SrS:Cu, e.g., 1% for SrS:Ag versus 10–15% for SrS:Cu. In other words, the silver acts to fill in the holes but is not considered a light-emitting dopant.

Thus, to date producers of thin film electroluminescent devices have yet to produce a blue emitting phosphor having sufficient luminance for use in a full color ACTFEL device.

SUMMARY OF THE INVENTION

The luminance of a blue light emitting phosphor is substantially improved according to the present invention which includes an ACTFEL device having front and rear electrode sets, a pair of insulators sandwiched between the front and rear electrode sets, and a thin film electroluminescent laminar stack which includes a phosphor layer having the formula M$^{II}$S:Cu,Ag where M$^{II}$ is taken from the group calcium, strontium, barium, and magnesium, S=sulfur, Cu=copper, and Ag=silver.

Preferably the phosphor laminate stack is annealed at between 550° and 850° centigrade prior to deposition of the top insulator layer. The M$^{II}$S:Cu,Ag layer includes concentrations of dopants as follows: the primary dopant Cu should be between 0.05 and 2 mol %; and Ag should be between 0.05 and 2 mol %. Additional phosphor layers in the electroluminescent laminate stack may be of materials that produce red and green light, respectively, so that the laminate stack as a whole produces "white" light. The layers in the EL phosphor laminate stack may be deposited by sputtering, atomic layer epitaxy, evaporation, and MOCVD. The preferred formulation for the M$^{II}$S:Cu,Ag layer is SrS:Cu,Ag. This device produces a blue emitting phosphor device having a broad band emission spectrum capable of producing a deep blue color and having a much greater luminance efficiency than the best available blue emitting phosphor to date.

The foregoing and other objectives, features, and advantages of the invention will be more readily understood upon consideration of the following detailed description of the invention, taken in conjunction with the accompanying drawings.

DETAILED DESCRIPTION OF THE PREFERRED EMBODIMENT

Figure 1:
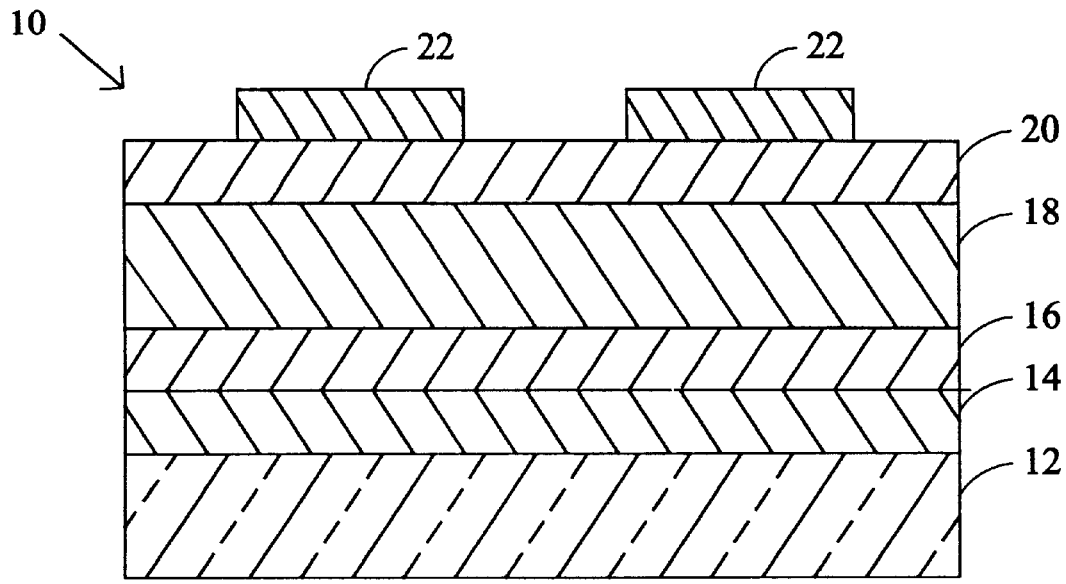
FIG. 1 is a partial side cutaway view of an ACTFEL device constructed according to the invention.

Referring to FIG. 1, an alternating current thin-film electroluminescent device 10 includes a glass substrate 12 onto which is deposited a layer of indium tin oxide (ITO) 14. An insulator layer 16 comprising an aluminum/titanium oxide is deposited on the ITO 14. A phosphor layer 18 includes a thin film of SrS:Cu,Ag. The phosphor layer 18 is sandwiched by a second insulator 20 preferably made of barium tantalate (BTO). Aluminum electrodes 22 are placed atop the BTO layer 20. The first insulator layer 16 is preferably approximately 260 nanometers thick and is deposited by atomic layer epitaxy (ALE). In an alternative embodiment, either dielectric (insulator) layer 16 or 20 could be removed. The electroluminescent phosphor layer 18 is preferably 600 nanometers to 2 micrometers thick and is deposited by sputtering from an SrS target prepared with the following doping concentration: copper, 0.05 to 2.0 mol %; and silver 0.05 to 2.0 mol %. To make a full color panel, a second phosphor layer such as ZnS:Mn or other red and green emitting phosphor (not shown in FIG. 1) may be deposited on the layer 18. During deposition, the substrate temperature is held to between 75° and 500° C. The phosphor films are then annealed at 550° to 850° C. in nitrogen. This is followed by the deposition of the second insulator layer 20 which is preferably 300 nanometers of ATO. The top aluminum electrodes 22 complete the device fabrication. Red, blue, and green inorganic filters may be interposed between the bottom electrode layer 14 and the viewer (not shown) to provide a filtered full-color TFEL display.

Figure 2:
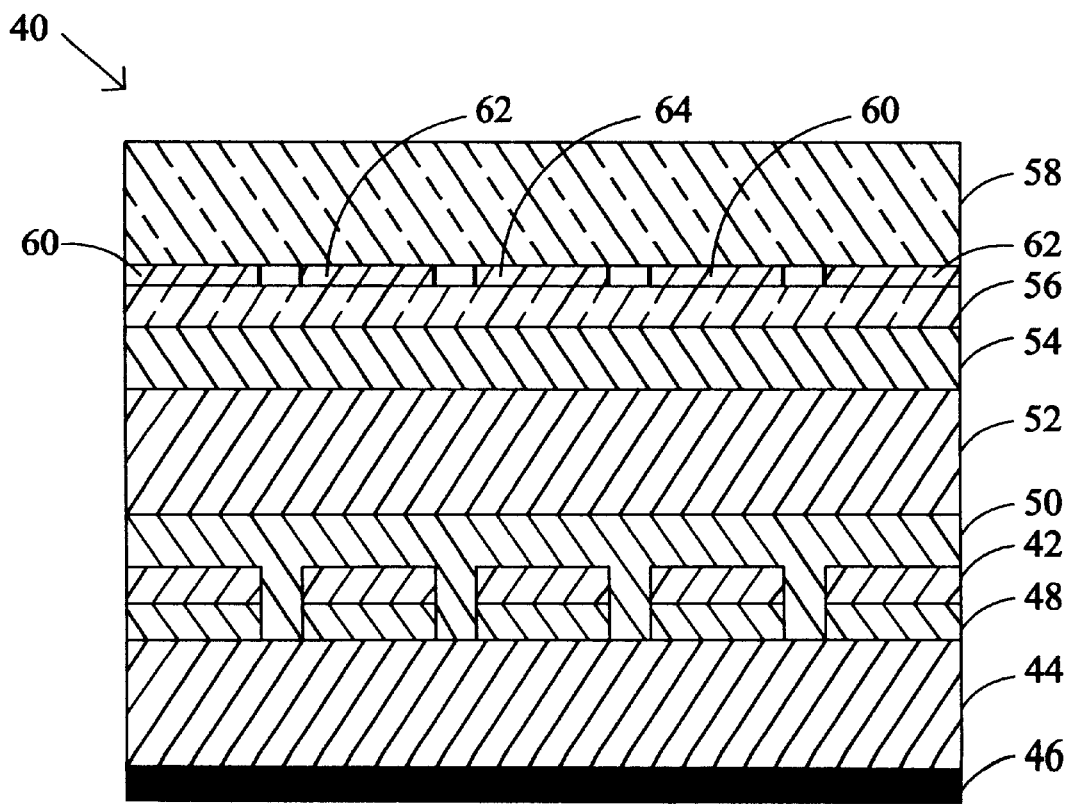
FIG. 2 is a partial side cutaway view of an alternative embodiment of an ACTFEL device made according to the invention.

FIG. 2 shows an "inverted" structure electroluminescent device 40 that is similar to FIG. 1 for making a color TFEL display. The device 40 is constructed with a substrate 44 that preferably has a black coating 46 on the lower side if the substrate 44 is transparent. On the substrate 44 are deposited rear electrodes 48. Between the rear electrodes 48 and the rear dielectric layer 50 is a thin film absorption layer 42. The absorption layer is either constructed of multiple graded thin film layers or is a continuous graded thin film layer made by any appropriate method. An electroluminescent layer 52 which may be a laminated structure including at least one layer having the formula M$^{II}$S:Cu,Ag and layers of red and green emitting phosphor, e.g., ZnS:Mn, ZnS:Tb or SrS:Ce, is sandwiched between a rear dielectric layer 50 and a front dielectric layer 54. In an alternative embodiment, either dielectric layer 50 or 54 could be removed. A transparent electrode layer 56 is formed on the front dielectric layer 54 and is enclosed by a transparent substrate 58. The substrate 58 may include color filter elements 60, 62 and 64 filtering red, blue and green light, respectively, for making a color TFEL display.

The electroluminescent phosphor layer has a chemical composition primarily consisting of SrS:Ag,Cu. To assist in forming a high quality crystal structure Ga may also be added. The phosphor layer may be deposited by any suitable method, such as one of the two methods described below. The first method is to deposit a multilayer stack of SrS:Cu, Ga and SrS:Ag,Ga sub-layers from two singly doped targets each having about 0.05 to 2.0 mol % Cu or Ag and 0.5 to 10 mol % Ga. The film stack is then post annealed at 550 to 850 C in nitrogen. During annealing, the Cu and the Ag diffuse out of the sub-layers and become intermixed uniformly throughout the stack. The second method is to deposit films from targets already doped with Cu and Ag. The targets have a typical doping concentration of Ag: 0.05 to 2.0 mol %, Cu:0.05 to 2.0 mol % and Ga:0.5 to 10 mol %. The role of Ga is to act as a flux to improve the crystalline quality of SrS films by post annealing at 550 to 850 C in nitrogen as described in U.S. Pat. No. 5,677,594.

Figure 3:
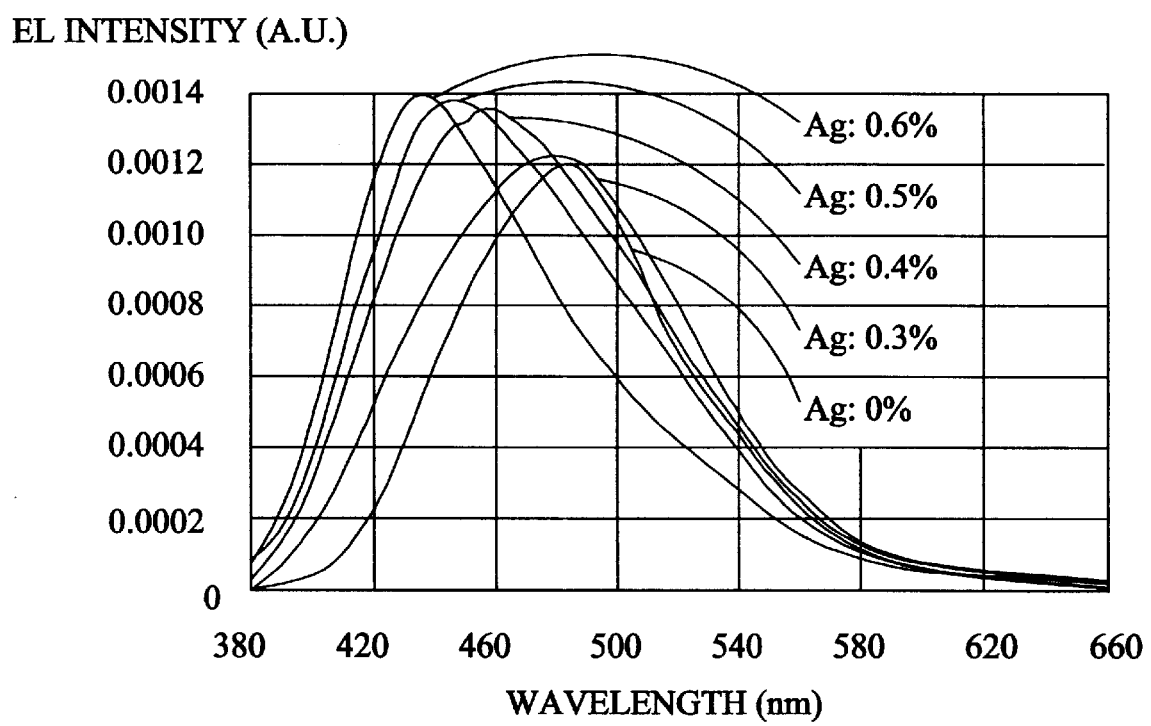
FIG. 3 is a graph illustrating the spectral characteristics of sample blue emitting phosphor of the invention.

The present inventor tested a SrS:Cu ACTFEL device which was very efficient as previously noted, e.g., luminance measured at 40 V above threshold driven at 60 Hz ($L_{40}$@60 Hz) was close to 35 cd/m$^2$ with a greenish blue color, CIE x=0.16, y=0.28. The present inventor also tested a SrS:Ag ACTFEL device which as expected was inefficient, e.g., $L_{40}$ @60 Hz<0.5 cd/m$^2$. On the other hand, devices with doubly doped SrS:Cu,Ag exhibited a deeper blue color and a higher radiative efficiency than singly doped SrS:Cu devices. The effect of Ag doping concentration on the electroluminescent emission spectra of SrS:Cu,Ag is shown in FIG. 3. FIG. 3 shows the luminance intensity of the 480 nm peak was greatly increased with just a small addition of Ag. At higher Ag concentration, the emission peak actually shifted to 430–440 nm. The ACTFEL devices made with an Ag concentration of 0.6 at 3% exhibited a saturated blue color, e.g., CIE x=0.17, y=0.13, with excellent luminance and luminous efficiency, e.g., $L_{40}$=20 cd/m$^2$, and $e_{40}$=0.15 lm/W. The latter phosphor is nearly five times of those measured in the best $(Sr,Ca)Ga_2S_4$:Ce device with the same deep blue color. It is also possible to achieve the same high luminance as singly doped SrS:Cu devices, e.g., $L_{40}$=34 cd/m$^2$, while still retaining most of the blue color, e.g., CIE y=0.20, by slightly reducing the Ag concentration in SrS:Cu,Ag devices. This represents a 30 percent improvement in the luminance efficiency of SrS:Ag,Cu over SrS:Cu devices. The following two tables summarize its performance.

TABLE 1

Blue EL Phosphor Luminance Performance

| Phosphor Materials | $L_{40}$ @60 Hz (cd/m$^2$) | $e_{40}$ (lm/W) | Relative Radiative Efficiency | CIEx | CIEy |
|---|---|---|---|---|---|
| SrS: Ag, Cu | 20 | 0.15 | 1.15 | 0.15 | 0.13 |
|  | 35 | 0.24 | 1.14 | 0.16 | 0.21 |
| SrS: Cu | 35 | 0.24 | 0.89 | 0.16 | 0.27 |
| SrS: Ce/ filter | 6 | 0.04 | 0.29 | 0.09 | 0.14 |
| SrCaGa$_2$S$_4$: Ce | 5 | 0.03 | 0.21 | 0.15 | 0.14 |

TABLE 2

| Ag Conc. (at %) | $L_{40}$ @60 Hz (cd/m$^2$) | $e_{40}$ (lm/W) | CIEx | CIEy |
|---|---|---|---|---|
| 0.0 | 34 | 0.24 | 0.17 | 0.28 |
| 0.2 | 32 | 0.24 | 0.18 | 0.26 |
| 0.3 | 34 | 0.27 | 0.17 | 0.25 |
| 0.4 | 35 | 0.24 | 0.16 | 0.21 |
| 0.5 | 28 | 0.20 | 0.17 | 0.16 |
| 0.6 | 20 | 0.15 | 0.17 | 0.13 |
| 0.7 | | | Burn Out | |

Table 2 details the effect of Ag doping concentration on the EL performance of SrS:Ag,Cu devices (Cu concentration was kept roughly constant at 0.2%–0.3%).

The level of blue shift in SrS:Cu,Ag devices, e.g., >0.3 eV, is too large to be explained by the suppression of Cu$^+$ aggregate formation from Ag$^+$ co-doping. It is more likely that the Ag$^+$ centers have become EL effective in these devices and gave an emission band peaked at 430 nm, however, the exact mechanism is not clear at this moment. One possible explanation is that Cu$^+$ and Ag$^+$ ions might have formed an effectively coupled center that the excited Cu ions are able to transfer the energy to Ag$^+$ ions and allow effective Ag$^+$ emission to occur. The energy transfer channel has been identified in a photoluminescent (PL) study described in detail later. It is shown that there is a common absorption band at 4.46eV in PL excitation spectra of SrS:Cu, SrS:Ag, and SrS:Ag,Cu. The absorption band is greatly enhanced in SrS:Ag,Cu when compared to singly doped films, suggesting this band could be the pathway for energy transfer. It is understood that other activators with the same optical characteristics as Cu could also be used to activate Ag blue emission in SrS and achieve even more luminance and efficiency enhancement.

Figure 4:
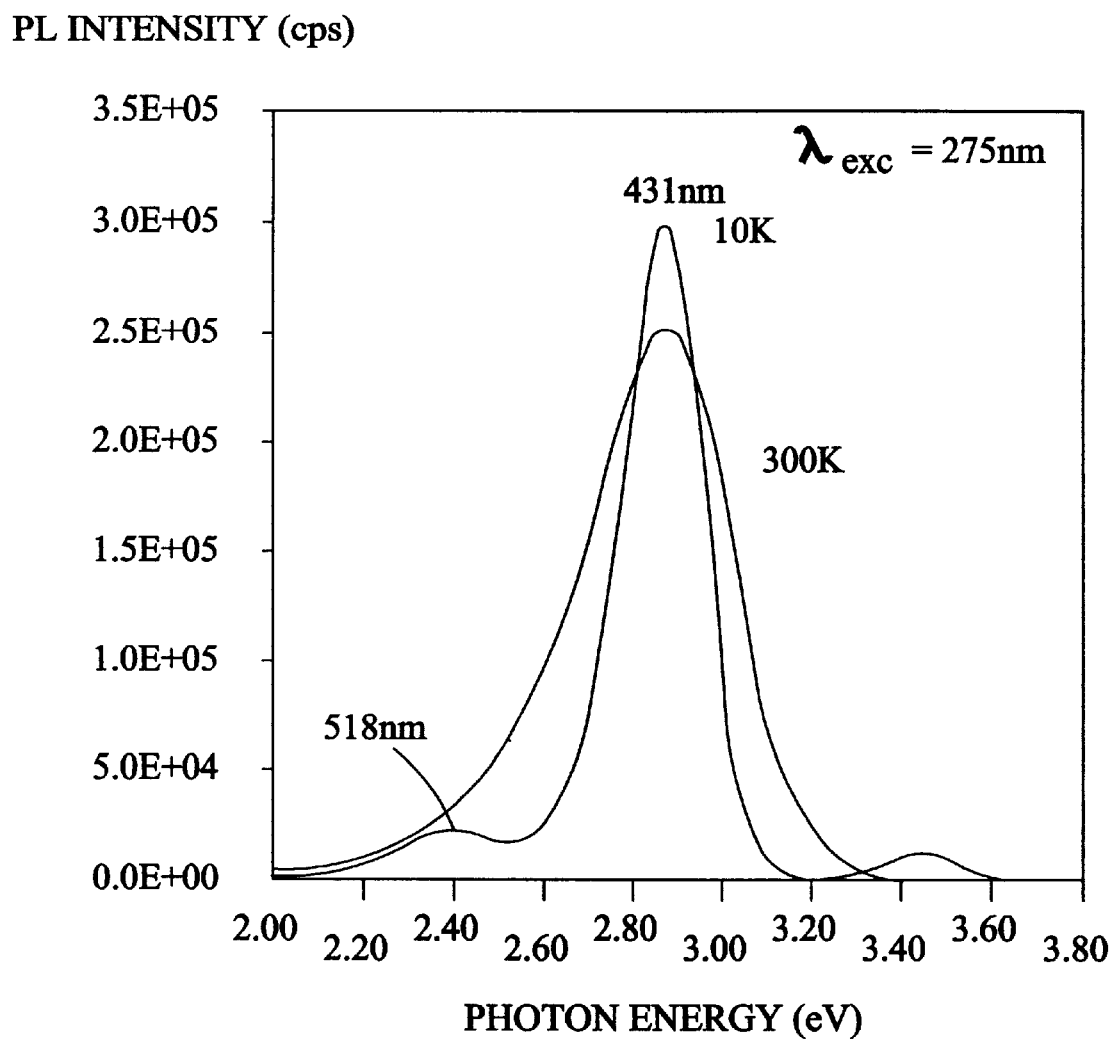
FIG. 4 is a graph of the PL spectra of SrS:Cu,Ag thin film at 10 and 300K.
Figure 5:
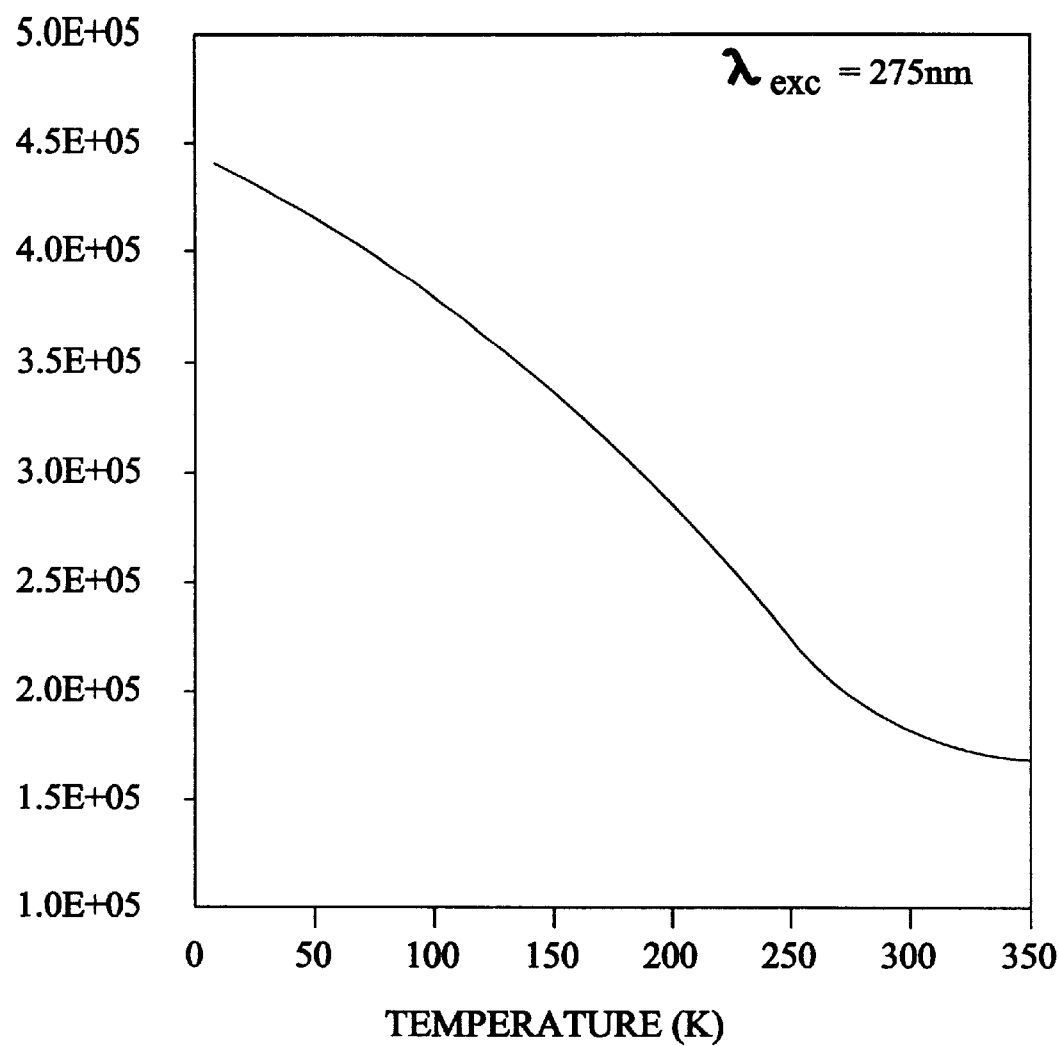
FIG. 5 is a graph of the thermal quenching of PL for SrS:Cu,Ag thin film.

A detailed analysis of the spectroscopic investigations on SrS:Cu,Ag thin film phosphors grown by standard magnetron sputtering technique revealed the following. The PL spectra at 10K and 300K are shown in FIG. 4. The film exhibited a deep blue color at 300K with a peak position at 2.876 eV (431 nm) and a linewidth of 390 meV, providing a blue CIE color coordinate of (x=0.165, y=0.088). As the temperature was decreased to 10K, the emission band did not show any substantial shift but the linewidth was decreased to 215 meV. At low temperatures, two additional emission bands were also observed at 3.443 eV and 2.398 eV. By comparing with the low temperature PL spectra of SrS:Cu and SrS:Ag, the present inventor has assigned the two peaks at 3.443 and 2.876 eV to Ag$^+$ emission and the 2.398 eV peak to Cu$^+$ emission. This assignment was supported by the temperature dependence of these three emission bands. The two Ag emission bands did not show any shift with temperature whereas the Cu emission exhibited a large blue shift with increasing temperature. The behaviors were consistent with those observed from singly doped SrS:Ag and SrS:Cu. The enhancement of the 2.876 eV Ag emission and the simultaneous suppression of the Cu emission suggested energy transfer from Cu to Ag. As shown in FIG. 5, the main emission band also exhibited thermal quenching as the temperature was increased. At room temperature, the PL intensity was reduced to about 45% of that at 10K, which is indicative of thermally activated non-radiative processes. The main emission band also exhibited thermal broadening from which a phonon energy of 17 meV was obtained. From this phonon energy and low temperature linewidth, the Huang-Rhys parameter was calculated to be about 19. The strong electron-phonon coupling indicated by the large value of Huang-Rhys parameter was consistent with the PL spectra which showed the absence of zero-phonon line and the broad linewidth at 10K. However, it is possible that more than one vibrational modes were involved in the broadening process which could result in an overestimation of Huang-Rhys parameter.

Figure 6:
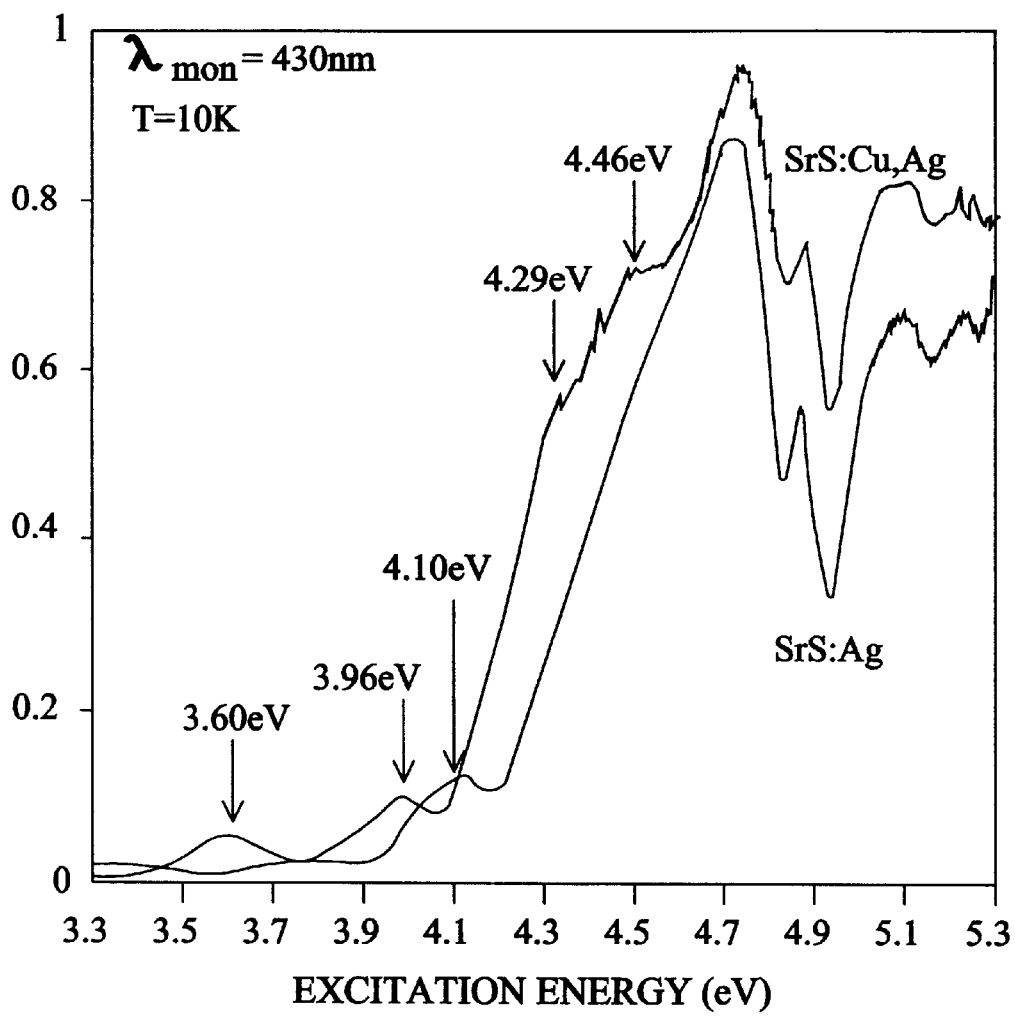
FIG. 6 is a graph of the PLE spectra of SrS:Cu,Ag and SrS:Ag thin films at 10K.

The low temperature PL excitation (PLE) spectra of the 3.443 and 2.398 eV emission bands were identical to those obtained from singly doped SrS:Ag and SrS:Cu samples, confirming the assignments of the 3.443 eV band being Ag$^+$. FIG. 6 shows the PLE spectra of the main emission band at 2.876 eV along with that of SrS:Ag. The singly doped SrS:Ag exhibited two excitation bands at about 4.46 and 4.10 eV. In SrS:Ag,Cu, the 4.46 eV excitation band was significantly enhanced, exhibiting an additional shoulder feature at around 4.29 eV. These two main excitation bands around 4.46 eV suggested that the energy transfer from Cu to Ag take place through these bands.

Figure 7:
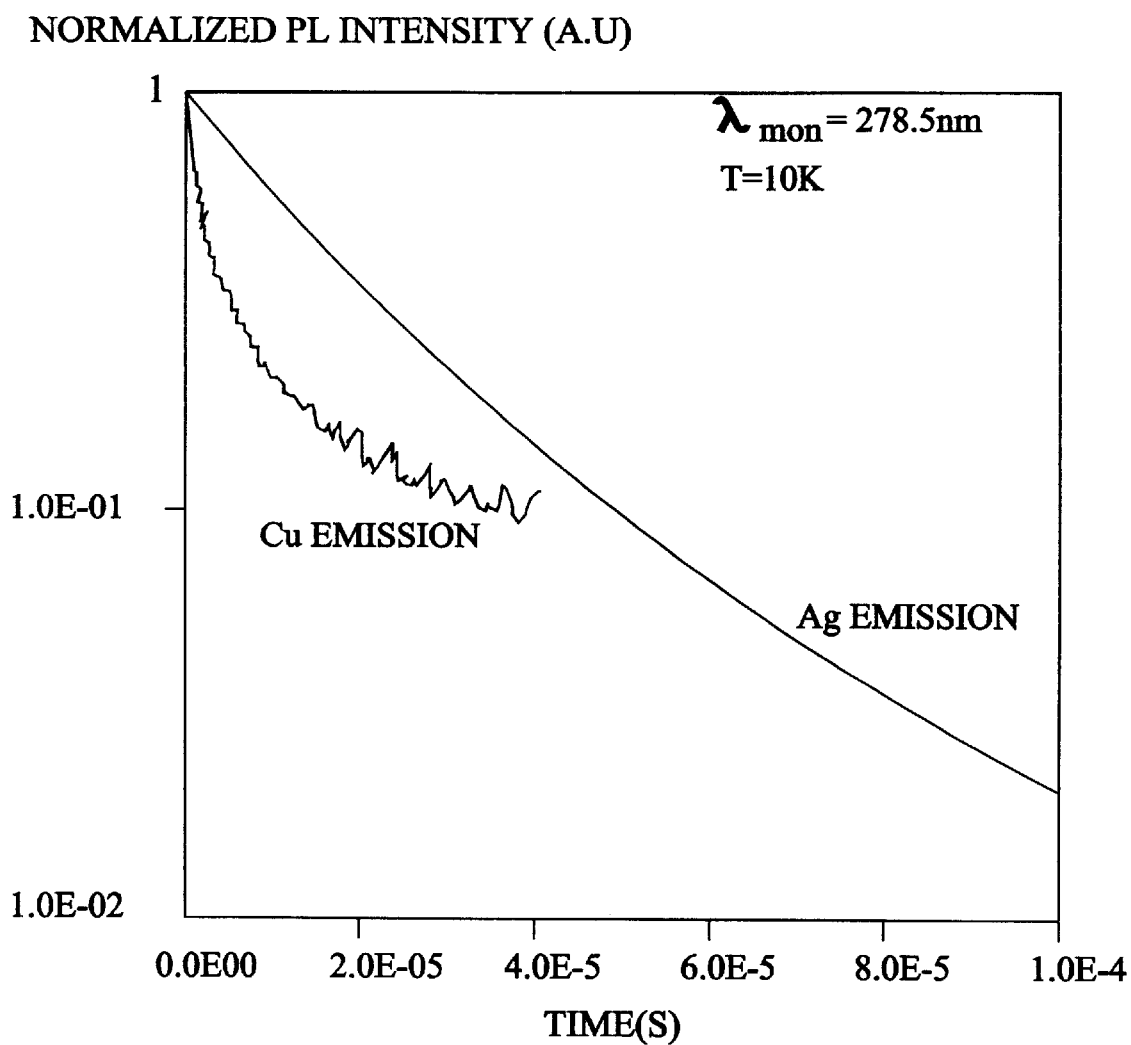
FIG. 7 is a graph of the PL decay of the 2.87 eV (430 nm) and 2.398 eV (517 nm) emission of SrS:Cu,Ag.

FIG. 7 shows the PL decays of SrS:Cu,Ag. Under the resonant excitation of 4.46 eV excitation band, the 2.876 eV emission band exhibited a single exponential decay with a small non-exponential component at the beginning. The decay times for the fast component and the exponential component were determined to be 5 us an 28 us, respectively. As the excitation energy was changed to 4.00 eV, the decay of 2.876 eV (430 nm) emission changed little, indicating that the recombination process was not affected by the excitation energy. On the other hand, the 2.398 eV Cu emission band showed a very fast decay also highly non-exponential with an effective decay time of 9 us. This is in contrast to the slow decay observed in singly doped SrS:Cu, which had an effective decay time of 93 us. The observed fast decay for the Cu emission was indicative of efficient energy transfer fro Cu to Ag. When the excitation energy was changed to 4.0 eV at which energy Cu has a large excitation band, but for which Ag has no comparable feature, the decay of the 2.398 eV Cu emission band remained non-exponential with an effective decay time of about 80 us, which was much slower and close to singly doped SrS:Cu. Consistent with the PLE studies, these results clearly indicate that the energy transfer from Cu to Ag occurred through the 4.46 eV excitation bands and was not efficient when lower energy excitation band was excited.

The present inventor developed the SrS:Cu,Ag material in the following manner. The present inventor realized that SrS:Cu has a dim blue output at about 480 nm but desired a phosphor with greater luminescence. The present inventor has experienced difficulty fabricating thin films with high quality crystallinity of CaS:Cu which have a deeper blue at 430 nm than SrS:Cu. The present inventor when testing SrS:Ag noticed a good crystallinity and a blue output under ultraviolet light at about 430 nm. However, the luminescence output of SrS:Ag in an ACTFEL device is extremely low. With two unusable targets (SrS:Ag and CaS:Cu), one with a good blue output having poor crystallinity and the other with good crystallinity having good blue output under ultraviolet light, the present inventor attempted to mix the two to obtain a good blue output with good crystallinity. The shocking result of Ca,SrS:Ag,Cu was a superior blue color at 430 nm. The present inventor tried the combinations of CaS and SrS with Ag,Cu to determine which was the cause and determined that SrS:Cu,Ag was the best source of the superior blue output.

It is also understood that a broadband (white) emitting EL phosphor can be achieved by laminating SrS:Ag,Cu layer with a ZnS:Mn or other yellow or red/green emitting phosphor layer to produce white monochrome or color EL displays. The phosphor can be constructed using any suitable technique, such at sputtering, atomic layer epitaxy, and evaporation.

It is also understood that although the invention has been described primarily in terms of a conventional ACTFEL device which will be viewed with the glass substrate forming the face of a TFEL panel, the phosphor of the present invention may also be used in an inverted structure and viewed from the film side of the structure. In the latter case the first deposited electrode will be a refractive metal such as molybdenum.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A light emitting phosphor material that primarily emits light in the blue region of the visible light spectrum for an alternating current thin-film electroluminescent device that includes said phosphor material sandwiched between a pair of dielectric layers suitable to substantially prevent DC current from flowing therebetween, where said phosphor material has the formula $M''S:Cu,Ag$ where $M''$ is taken from the group calcium, strontium, barium and magnesium, S is sulphur, Cu is copper, and Ag is silver.

2. The light emitting phosphor of claim 1 wherein $M''$ is strontium.

3. The light emitting phosphor of claim 2 wherein the doping concentration of copper is between 0.05 and 2 mol %, and the doping concentration of silver is between 0.05 and 2 mol %.

4. The light emitting phosphor of claim 1 wherein $M''S$ is at least one of strontium sulfide and calcium sulfide.

5. The light emitting phosphor of claim 1 wherein said phosphor material emits blue light, and whose emission spectrum has a peak wavelength between 420 and 480 nm.

6. The light emitting phosphor material of claim 1 wherein said material is a thin film which has been annealed at between 550–850° C.

7. An alternating current thin-film electroluminescent device comprising front and rear sets of electrodes sandwiching a pair of insulators, said pair of insulators sandwiching thin film electroluminescent phosphor material therebetween suitable to substantially prevent DC current from flowing therebetween, said phosphor material primarily emitting light in the blue region of the visible light spectrum comprising a thin film layer having the formula $M''S:Cu,Ag$ where $M''$ is taken from the group calcium, strontium, barium, and magnesium, S is sulphur, Cu is copper, and Ag is silver.

8. The ACTFEL device of claim 4 wherein $M''$ is taken from the group strontium, calcium, barium, and magnesium.

9. The ACTFEL device of claim 7 wherein $M''$ is strontium.

10. The ACTFEL device of claim 9 wherein the dopant concentrations are: copper is between 0.05 and 2 mol %, silver is between 0.05 and 2 mol %, and further including Ga.

* * * * *